United States Patent [19]

Alexandre

[11] 4,027,487
[45] June 7, 1977

[54] METHOD FOR ADJUSTING AN AUTOMATIC SLUICE WITH A VIEW TO ENSURING A DETERMINED LEVEL

[75] Inventor: Philippe Alexandre, La Tronche, France

[73] Assignee: Societe Generale de Constructions Electriques et Mecaniques (Alsthom), Paris Cedex, France

[22] Filed: Oct. 30, 1975

[21] Appl. No.: 627,041

[30] Foreign Application Priority Data

Oct. 30, 1974 France ............................ 74.36231

[52] U.S. Cl. .................................................. 61/25
[51] Int. Cl.² ........................................... E02B 7/42
[58] Field of Search ......................... 61/25, 22, 23

[56] References Cited

UNITED STATES PATENTS 2,699,652  1/1955  Laszlo .................... 61/25

3,683,630  8/1972  Alexandre ................ 61/25

FOREIGN PATENTS OR APPLICATIONS 165,194  11/1953  Australia ................. 61/25
263,188  12/1927  United Kingdom .......... 61/25
747,149  3/1956  United Kingdom .......... 61/25

*Primary Examiner*—Paul R. Gilliam
*Assistant Examiner*—David H. Corbin

[57] ABSTRACT

Method for adjusting an automatic sluice for it to ensure a constant upstream level at a determined level mark above or below its axis of oscillation, consisting in inserting a certain quantity of water into the float, effecting normally the balancing of the sluice by counterweights, the regulated level then being that of the axis of oscillation of the sluice, then adding or removing water in the float, causing, by the corresponding weighing down or lightening of the latter, the required shift in height of the previously regulated level.

3 Claims, 4 Drawing Figures

METHOD FOR ADJUSTING AN AUTOMATIC SLUICE WITH A VIEW TO ENSURING A DETERMINED LEVEL

The present invention relates to automatic sluices of the sector-shaped oscillating float type having a variable opposing couple intended to regulate hydraulically the flow of a canal to keep a constant level upstream of the sluice.

These sluices are essentially constituted by a frame comprising a sector-shaped gate, centered on an axis of rotation, a sector-shaped float centered on the same axis of rotation and protruding on the upstream face of the said gate and counterweights integral with the frame, the assembly oscillating about the said axis situated substantially at the mark of the level to be regulated. These sluices comprise, moreover, an opening stop which limits the opening to that for which the base of the float is tangent to the upstream level to be regulated, for beyond, the sluice would tilt into an excessively open position.

The present invention has as its object a method for regulating, according to cases of operation which may arise, levels above or below the mark of the axis of the sluice.

The method according to the invention consists in introducing a certain quantity of water in the float of the sluice, then in effecting the balancing thereof normally by means of the counterweights, the upstream level regulated by the sluice then being that of its axis of oscillation.

Then, to regulate the sluice in order for it to ensure the required level above or below the mark of oscillation of its axis, water is respectively added to or withdrawn from the float up to a height equal to the required shift in height of the level. Simultaneously, the opening stop is installed, this fixing the limit travel of the mobile part. In these sluices, the float is generally made of thin sheet metal, so that its internal shape is identical to its external shape and that its internal volume is substantially equal to its external volume.

In these conditions, water is respectively added to or withdrawn from the float up to a height equal to the required shift in height of the level above or below its axis.

An implementing of the method is given hereinbelow by way of example with no limiting character and with reference to the accompanying figures.

Figure 1:
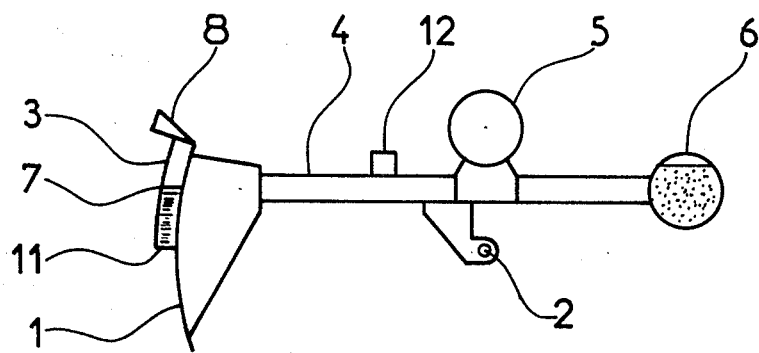
FIG. 1 is a diagrammatic elevation view showing a sluice according to the invention in the fully open position.
Figure 2:
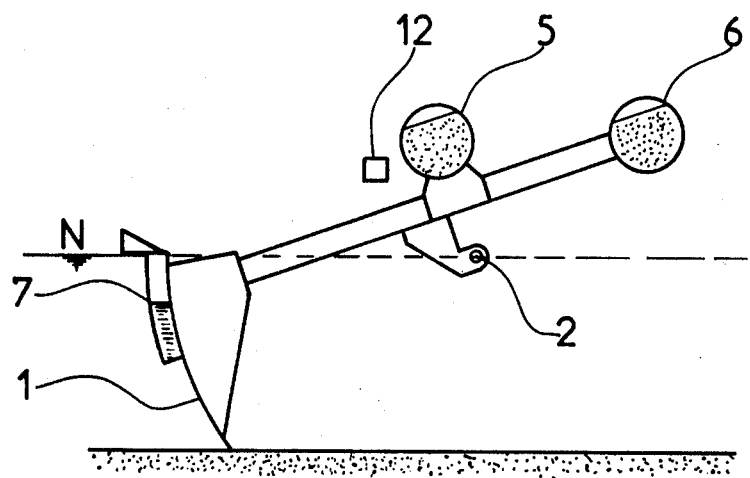
FIG. 2 is a diagrammatic elevation view showing the sluice in the fully closed position.

FIGS. 1 and 2 show a gate 1 having a cylindrical shape centered on an axis of rotation 2 about which the sluice assembly pivots, a sector-shaped float 3 forming a cylindrical protrusion on the gate, being centered in the same axis, with the arms 4 of the framework.

Two ballasting compartments 5 and 6 enable the balancing of the sluice, it being essential to place the compartment 5 vertically with respect to the axis of rotation 2 for one of the extreme positions, open or closed, of the sluice.

In the present example, the compartment 5 is placed vertically with respect to the axis of rotation for the open position of the sluice against its opening stop 12 such as shown in FIG. 1. In that position with the sluice fully open against its stop, the first regulating operation can take place without any water in the canal, since the float 3 is, in the fully open position, tangent to the level of water to be regulated.

The first regulating operation comprises, in the fully open position of the sluice against its stop, loading ballast into the compartment 6 until the sluice, almost balanced, retains only a very slight tendency to close.

The sluice closes and then the water level is made to rise slowly in the canal up to the level mark N of the articulation axis 2 of the sluice, as shown in FIG. 2.

When the sluice starts floating under the effect of that rise of the water level, the second regulating operation then consists in progressively loading ballast into the upper compartment 5 to cause the closing of the sluice and the holding of the position, that second regulating operation of bringing ballast into the compartment 5 not modifying the balance of the sluice when the latter resumes its first open position, since the compartment 5 is then vertical respect to the axis of rotation.

The sluice is thus normally regulated for maintaining the upstream level N at the height of its axis of rotation 2.

Figure 3:
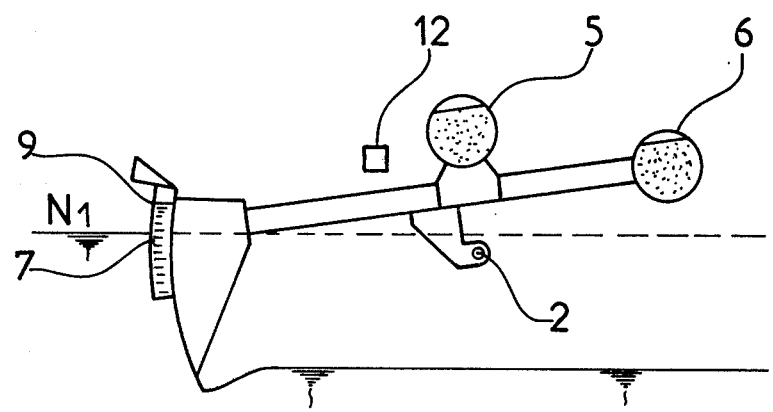
FIG. 3 is a diagrammatic elevation view showing the sluice with a level regulated above its axis.

To regulate an upstream level $N_1$ to the required level mark above the axis of rotation 2 of the sluice, water is added to the volume inside the float 3 through the opening 8 up to a level 9 at a suitable height above the level 7 as shown in FIG. 3 and the sluice then regulates the level $N_1$ above its axis of rotation 2.

Figure 4:
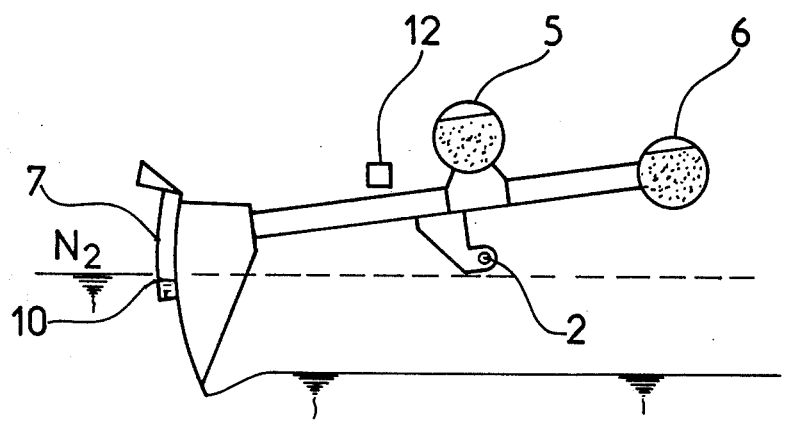
FIG. 4 is a diagrammatic elevation view showing the sluice with a level regulated below its axis.

On the contrary, to regulate the downstream level $N_2$ to the required level mark below the axis of rotation 2, water is withdrawn from the float 3 down to a level 10 below the level 7 as shown in FIG. 4 and the valve then regulates a level $N_2$ below its axis of rotation 2.

These regulating operations being ended, the opening stop 12 is adjusted in height so that it fixes the travel limit of the sluice in the fully open position corresponding to the new regulated level.

In the case of the present example, where the internal shape of the hollow sector-shaped float 3 is identical to its external shape and where its internal volume is substantially equal to its external volume (float made of thin sheet metal), to adjust the sluice so that it ensures a level above or below its axis of oscillation, it will be necessary only to add or withdraw, respectively, water from the float to a height equal to the required shift in height of the level.

I claim:

1. A method for adjusting an automatic sluice so that it ensures a constant upstream level of a liquid at a determined level mark above or below an axis of rotation of the sluice, the sluice being constituted by a frame pivotably mounted on said axis of rotation and including a sector-shaped gate positioned on said frame on one side of said axis of rotation and centered on said axis of rotation, a hollow sector-shaped float centered on the same axis of rotation and protruding at the upstream face of the said gate, and first and second regulable counterweights integral with the frame, the first counterweight being vertically disposed with respect to said axis in one position of said gate and remaining on one side of said axis in travel of the gate to the other position, the second counterweight being disposed on the frame on the opposite side of the axis from said gate, the assembly oscillating about said axis, the sluice further comprising an opening stop, said method comprising introducing a certain quantity of water in the float, effecting balancing of the sluice by adjusting the counterweights such that the regulated level of the liquid passes through the axis of oscillation of the sluice, adding or withdrawing water in the float to cause, by weight change thereof, a shift in height of the previously regulated level, and adjusting the position of the opening stop to fix the travel limit for the corresponding opening at the new regulated level.

2. Apparatus for adjusting an automatic sluice so that is ensures a constant upstream level of a liquid at a determined level mark above or below an axis of rotation of the sluice, said sluice comprising a frame pivotably mounted on the axis of rotation and including a sector-shaped gate positioned on said frame on one side of said axis of rotation and centered on said axis of rotation, a hollow sector-shaped float centered on the same axis of rotation and protruding at the upstream face of said gate, and first and second counterweights integral with the frame, the first counterweight being vertically disposed with respect to said axis in one position of said gate and remaining on one side of said axis in travel of the gate to the other position, the second counterweight being disposed on the frame on the opposite side of the axis from said gate, the assembly being oscillatable about said axis, said sluice further comprising an opening stop, said float being openable for introduction or removal of a certain quantity of water in the float to effect balancing of the sluice, said counterweights being regulable such that the regulated level then passes through the axis of rotation of the sluice, the addition of a greater amount of water or the removal of water from said float then causing by the weight change of the water a shift in height of the previously regulated level, said opening stop being adjustable in height to fix the travel limit for the corresponding opening at the new regulated level.

3. Apparatus as claimed in claim 2 wherein said float is thin-walled such that its internal volume is substantially equal to its external volume.

* * * * *